United States Patent
Kodama et al.

[19]

[11] Patent Number: 5,983,349
[45] Date of Patent: Nov. 9, 1999

[54] CHANGER APPARATUS, METHOD FOR LOCKING SECURITY PROTECTION THEREOF, METHOD FOR UNLOCKING EXECUTING COMMANDS THEREON, AND COMPUTER FOR SENDING COMMANDS THERETO

[75] Inventors: Masahiro Kodama; Yoshitsugu Taki, both of Kanagawa, Japan

[73] Assignee: Sony Corporation, Tokyo, Japan

[21] Appl. No.: 09/042,675

[22] Filed: Mar. 5, 1998

Related U.S. Application Data

[63] Continuation of application No. PCT/JP97/02527, Jul. 22, 1997.

[30] Foreign Application Priority Data

Jul. 22, 1996 [JP] Japan .................................... 8-192516

[51] Int. Cl.$^6$ .................................................. G11B 15/68
[52] U.S. Cl. ......................... 713/200; 713/201; 713/202; 707/9; 711/164
[58] Field of Search ............................... 395/186; 707/9; 711/163, 164; 713/200, 201, 202

[56] References Cited

FOREIGN PATENT DOCUMENTS

| | | |
|---|---|---|
| 63-31062 | 2/1988 | Japan . |
| 2-135523 | 5/1990 | Japan . |
| 4-257911 | 9/1992 | Japan . |
| 5-113932 | 5/1993 | Japan . |

*Primary Examiner*—Ly V. Hua
*Attorney, Agent, or Firm*—Frommer Lawrence & Haug, LLP.; William S. Frommer

[57] ABSTRACT

A changer apparatus capable of providing security protection. Tape cassettes are selected from a plurality of compartments constituting a cassette rack, and are loaded into drives (102-1) through (102-P) which write and read data to and from the cassettes. A nonvolatile memory (114) stores information about security protection locked on elements such as the compartments of the medium rack and the drives. When security protection is to be locked, a controller (110) admits an externally input security protection locking command, and writes accordingly to the memory (114) security protection information representing, for example, host IDs, password numbers, security levels, and a group of elements of which security is to be protected. When security protection is to be unlocked, the controller (110) admits an externally input security protection unlocking command, and erases the security protection information accordingly from the memory (114). When executing a command from a host computer, the controller (110) references the security protection information in the memory (114) for control over command execution, whereby security protection is ensured.

32 Claims, 14 Drawing Sheets

FIG. 4

| BITS<br>BYTES | 7 | 6 | 5 | 4 | 3 | 2 | 1 | 0 |
|---|---|---|---|---|---|---|---|---|
| 0 | OPERATION CODE (MOVE MEDIUM) ||||||||
| 1 | LUN ||| |||||
| 2 | TRANSFER ELEMENT ADDRESS ||||||||
| 3 | ||||||||
| 4 | SOURCE ELEMENT ADDRESS ||||||||
| 5 | ||||||||
| 6 | DESTINATION ELEMENT ADDRESS ||||||||
| 7 | ||||||||
| 8 | RESERVED ||||||| INVERT |
| 9 | CONTROL BYTE ||||||||

FIG. 5

| BITS / BYTES | 7 | 6 | 5 | 4 | 3 | 2 | 1 | 0 |
|---|---|---|---|---|---|---|---|---|
| 0 | OPERATION CODE (SECURITY PROTECTION COMMAND) ||||||||
| 1 | LUN ||| SECURITY LEVEL |||||
| 2 | MSB ||||||||
| 3 | PASSWORD NO. ||||||||
| 4 | ||||||||
| 5 | |||||||LSB |
| 6 | MSB | STARTING ADDRESS OF ELEMENT GROUP TO BE PROTECTED |||||||
| 7 | |||||||LSB |
| 8 | MSB | NO. OF ELEMENTS MAKING UP ELEMENT GROUP TO BE PROTECTED |||||||
| 9 | |||||||LSB |
| 10 | RESERVED ||||||| LOCK/UNLOCK |
| 11 | CONTROL BYTE ||||||||

FIG. 6

| HOST ID | PASSWORD NO. | ELEMENT GROUP | SECURITY LEVEL |
|---|---|---|---|
| A | a | STARTING ADDRESS = 1<br>ELEMENT COUNT = 2 | ① |
| B | b | STARTING ADDRESS = 8<br>ELEMENT COUNT = 2 | ② |
| ⋮ | ⋮ | ⋮ | ⋮ |

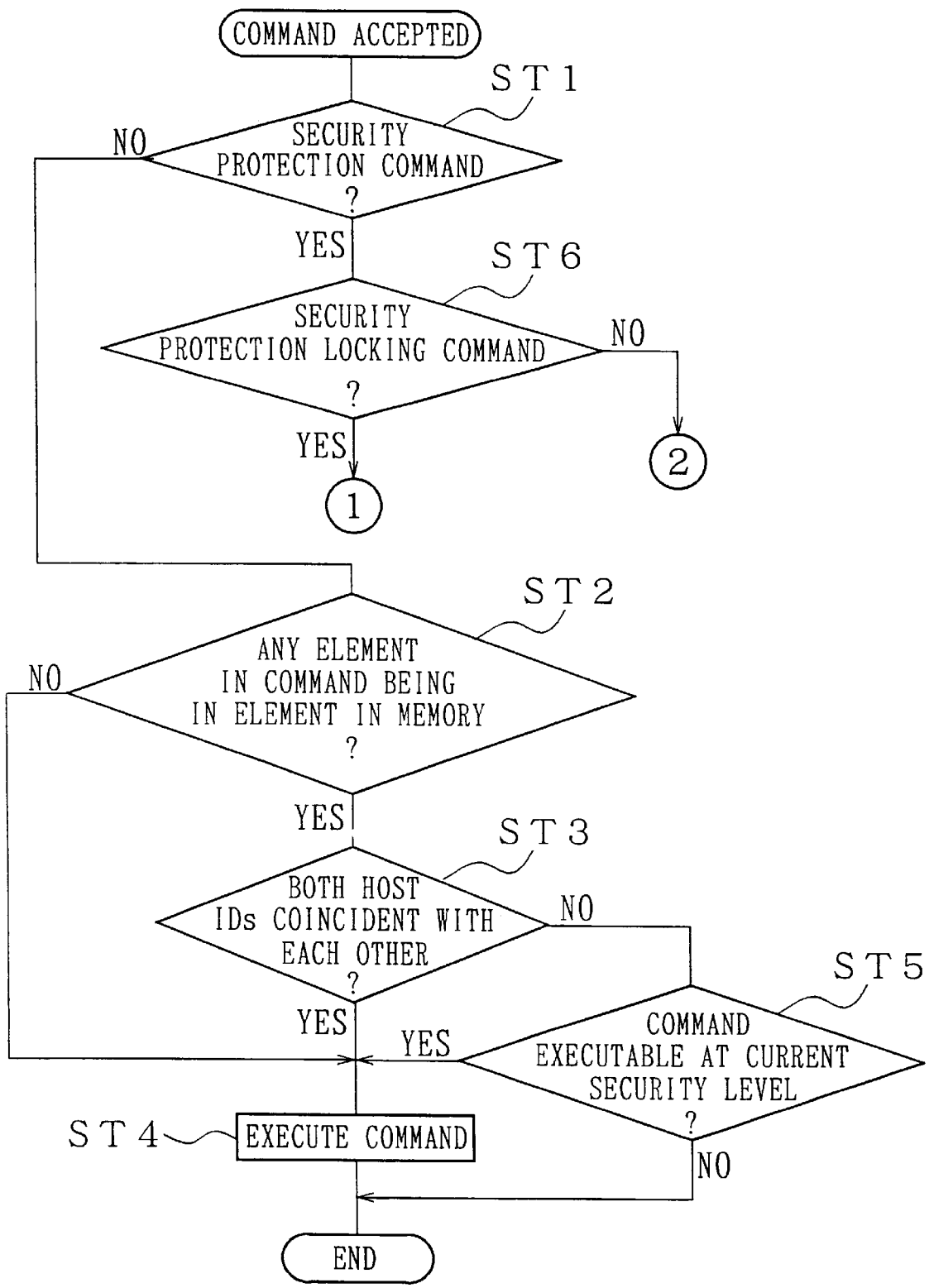

FIG. 12

| BITS<br>BYTES | 7 | 6 | 5 | 4 | 3 | 2 | 1 | 0 |
|---|---|---|---|---|---|---|---|---|
| 0 | OPERATION CODE (SECURITY PROTECTION COMMAND) ||||||||
| 1 | LUN ||| SECURITY LEVEL |||||
| 2 | RESERVED ||||||||
| 3 | ~ ||||||||
| 4 | ~ ||||||||
| 5 | ~ ||||||||
| 6 | ~ ||||||||
| 7 | MSB ||||||||
| 8 | PARAMETER LENGTH ||||||||
| 9 | LSB ||||||||
| 10 | RESERVED ||||||| LOCK/UNLOCK |
| 11 | CONTROL BYTE ||||||||

FIG. 13

| BITS\BYTES | 7 | 6 | 5 | 4 | 3 | 2 | 1 | 0 |
|---|---|---|---|---|---|---|---|---|
| 0 | MSB | \multicolumn{6}{c}{NO. OF DIGITS MAKING UP PASSWORD NUMBER} | |
| 1 | | | | | | | | LSB |
| 2 | MSB | | | | | | | |
| ⋮ | | \multicolumn{6}{c}{PASSWORD NUMBER (n−2 BYTES)} | | |
| n−2 | | | | | | | | |
| n−1 | | | | | | | | LSB |
| n | MSB | \multicolumn{6}{c}{NO. OF ELEMENT GROUPS TO BE PROTECTED (AS MANY AS m)} | |
| n+1 | | | | | | | | LSB |
| n+2 | MSB | \multicolumn{6}{c}{STARTING ADDRESS OF ELEMENT GROUP 1 TO BE PROTECTED} | |
| n+3 | | | | | | | | LSB |
| n+4 | MSB | \multicolumn{6}{c}{NO. OF ELEMENTS MAKING UP ELEMENT GROUP 1 TO BE PROTECTED} | |
| n+5 | | | | | | | | LSB |
| ⋮ | | | | | | | | |
| n+m×4−2 | MSB | \multicolumn{6}{c}{STARTING ADDRESS OF ELEMENT GROUP m TO BE PROTECTED} | |
| n+m×4−1 | | | | | | | | LSB |
| n+m×4 | MSB | \multicolumn{6}{c}{NO. OF ELEMENTS MAKING UP ELEMENT GROUP m TO BE PROTECTED} | |
| n+m×4+1 | | | | | | | | LSB |

FIG. 14

| BITS / BYTES | 7 | 6 | 5 | 4 | 3 | 2 | 1 | 0 |
|---|---|---|---|---|---|---|---|---|
| 0 | OPERATION CODE (SECURITY PROTECTION COMMAND) ||||||||
| 1 | LUN ||| SECURITY LEVEL |||||
| 2 | AREA ID ||||||||
| 3 | RESERVED ||||||||
| 4 | ||||||||
| 5 | ||||||||
| 6 | ||||||||
| 7 | MSB |||||||| 
| 8 | PARAMETER LENGTH ||||||||
| 9 | |||||||LSB |
| 10 | RESERVED ||||||| LOCK/UNLOCK |
| 11 | CONTROL BYTE ||||||||

FIG. 15

| BITS<br>BYTES | 7 | 6 | 5 | 4 | 3 | 2 | 1 | 0 |
|---|---|---|---|---|---|---|---|---|
| 0 | MSB | | | | | | | |
| 1 | | NO. OF DIGITS MAKING UP PASSWORD NUMBER | | | | | | LSB |
| 2 | MSB | | | | | | | |
| ⋮ | | PASSWORD NUMBER (n-2 BYTES) | | | | | | |
| n-2 | | | | | | | | |
| n-1 | | | | | | | | LSB |
| n | MSB | STARTING ADDRESS OF ELEMENT GROUP TO BE PROTECTED | | | | | | |
| n+1 | | | | | | | | LSB |
| n+2 | MSB | NO. OF ELEMENTS MAKING UP ELEMENT GROUP TO BE PROTECTED | | | | | | |
| n+3 | | | | | | | | LSB |

FIG. 16

| HOST ID | PASSWORD NO. | AREA ID | ELEMENT GROUP | SECURITY LEVEL |
|---|---|---|---|---|
| A | a | α | STARTING ADDRESS = 1<br>ELEMENT COUNT = 2 | ① |
| B | b | β | STARTING ADDRESS = 8<br>ELEMENT COUNT = 2 | ② |
| ⋮ | ⋮ | ⋮ | ⋮ | ⋮ |

CHANGER APPARATUS, METHOD FOR LOCKING SECURITY PROTECTION THEREOF, METHOD FOR UNLOCKING EXECUTING COMMANDS THEREON, AND COMPUTER FOR SENDING COMMANDS THERETO

This is a continuation of copending International Application PCT/JP97/02527 having an international filing date of Jul. 22, 1997.

TECHNICAL FIELD

The present invention relates to a changer apparatus practiced illustratively as a tape changer apparatus and a disk changer apparatus, a method for locking security protection of the apparatus, a method for unlocking security protection of the apparatus, a method for executing commands on the apparatus, and a computer for sending commands to the apparatus. More particularly, the invention relates to a changer apparatus comprising a memory for storing information about security protection, the information being referenced in order to control the execution of commands sent from a computer or the like, whereby the security of data held in the changer apparatus is protected.

BACKGROUND ART

There exist changer apparatuses each capable of selecting any of recording media such as tape cassettes and optical disks from a plurality of compartments constituting a medium rack, the selected recording medium being loaded into a drive whereby data is written and read to and from the medium. Illustratively, this type of changer apparatus has a standardized interface such as SCSI (Small Computer System Interface) through which the changer apparatus is connected to a single or a plurality of host computers.

Conventional changer apparatuses do not have security protection features. Such a changer apparatus lets all recording media therein be accessed from any host computer which can readily read data from the media. Although the SCSI has reserve commands, reserved information is released when power is turned off or when a reset signal is input. The turning-off of power or the input of the reset signal is accomplished regardless of a host computer having reserved information in the change apparatus.

Today, changer apparatuses are diverse and widespread in their uses. Against this background, it is becoming mandatory for the changer apparatus to protect the security of data held inside in a growing number of applications.

It is therefore an object of the present invention to provide a changer apparatus capable of adequately protecting the security of data inside. Another object of the present invention is to provide methods for allowing a computer or the like to lock and to unlock security protection of a changer apparatus.

DISCLOSURE OF INVENTION

In carrying out the invention and according to one aspect thereof, there is provided a changer apparatus comprising: a medium rack having a plurality of compartments for accommodating recording media; at least one drive for gaining access to the recording media; recording medium transfer means for transferring the recording media between the medium rack and the drive; storage means for storing security protection information by which to ensure security protection of the changer apparatus; command input means for admitting an externally input command; and a system controller for controlling execution of the command entered through the command input means in accordance with the security protection information stored in the storage means.

According to another aspect of the invention, there is provided a host computer for use with a changer apparatus comprising a medium rack having a plurality of compartments for accommodating recording media, at least one drive for gaining access to the recording media, recording medium transfer means for transferring the recording media between the medium rack and the drive, storage means for storing security protection information by which to ensure security protection of the changer apparatus, command input means for admitting an externally input command, and a system controller for controlling execution of the command entered through the command input means in accordance with the security protection information stored in the storage means, the host computer outputting the command to the changer apparatus, the host computer comprising: storage means for storing a host ID of the host computer; password number input means for admitting a password number corresponding to the host ID; element information input means for admitting element information designating at least one element on which the command is to be executed; command type input means for admitting a command type indicating at least whether the command is a security protection locking command or a security protection unlocking command; command generation means for generating the command by formatting the host ID, the password number, the element information, and the command type into a suitable format; and output means for outputting the command to the changer apparatus.

According to a further aspect of the invention, there is provided a command execution method for use with a changer apparatus comprising a medium rack having a plurality of compartments for accommodating recording media, at least one drive for gaining access to the recording media, recording medium transfer means for transferring the recording media between the medium rack and the drive, storage means for storing security protection information by which to ensure security protection of the changer apparatus, command input means for admitting an externally input command, and a system controller for controlling execution of the command entered through the command input means in accordance with the security protection information stored in the storage means, the command execution method comprising the steps of: verifying whether element information included in the command to designate an element on which the command is to be executed coincides with element information included in the security protection information stored in the storage means; and executing the command on the element designated by the element information included in the command if the two kinds of element information are found not to coincide with each other.

According to an even further aspect of the invention, there is provided a security protection locking method for use with a changer apparatus comprising a medium rack having a plurality of compartments for accommodating recording media, at least one drive for gaining access to the recording media, recording medium transfer means for transferring the recording media between the medium rack and the drive, storage means for storing security protection information by which to ensure security protection of the changer apparatus, command input means for admitting an externally input command, and a system controller for controlling execution of the command entered through the command input means in accordance with the security protection information stored in the storage means, the security protection locking method comprising the steps of: admitting a command from a host computer furnished externally; verifying whether the command received from the host computer is a security protection locking command; if the command from the host computer is found to be a security protection locking command, verifying whether element information included in the security protection locking command to designate an element on which security protection is to be locked overlaps with element information included in the security protection information stored in the storage means; and if the two kinds of element information are found not to overlap with each other, storing into the storage means a host ID of the host computer, a password number corresponding to the host ID, the element information included in the security protection locking command, and a restricted range in which commands from the host computer are executed.

According to a still further aspect of the invention, there is provided a security protection unlocking method for use with a changer apparatus comprising a medium rack having a plurality of compartments for accommodating recording media, at least one drive for gaining access to the recording media, recording medium transfer means for transferring the recording media between the medium rack and the drive, storage means for storing security protection information by which to ensure security protection of the changer apparatus, command input means for admitting an externally input command, and a system controller for controlling execution of the command entered through the command input means in accordance with the security protection information stored in the storage means, the security protection unlocking method comprising the steps of: admitting a command from a host computer furnished externally; verifying whether the command received from the host computer is a security protection unlocking command; if the command from the host computer is found to be a security protection unlocking command, verifying whether a host ID of the host computer coincides with a host ID in the security protection information stored in the storage means; if the host ID of the host computer and the host ID in the security protection information stored in the storage means are found to coincide with each other, verifying whether a password number included in the security protection unlocking command coincides with a password number in the security protection information; if the two password numbers are found to coincide with each other, verifying whether element information included in the security protection unlocking command to designate an element of which security is protected coincides with element information included in the security protection information; and if the two kinds of element information are found to coincide with each other, erasing from the storage means the host ID constituting part of the security protection information, a password number corresponding to the host ID, the element information, and a security level designating a restricted range in which commands from the host computer are executed.

According to a yet further aspect of the invention, there is provided a security protection unlocking method for use with a changer apparatus comprising a medium rack having a plurality of compartments for accommodating recording media, at least one drive for gaining access to the recording media, recording medium transfer means for transferring the recording media between the medium rack and the drive, storage means for storing security protection information by which to ensure security protection of the changer apparatus, command input means for admitting an externally input command, and a system controller for controlling execution of the command entered through the command input means in accordance with the security protection information stored in the storage means, the security protection unlocking method comprising the steps of: admitting a command from a host computer furnished externally; verifying whether the command received from the host computer is a security protection unlocking command; if the command from the host computer is found to be a security protection unlocking command, verifying whether a host ID of the host computer coincides with a host ID in the security protection information stored in the storage means; if the host ID of the host computer and the host ID in the security protection information stored in the storage means are found to coincide with each other, verifying whether a password number included in the security protection unlocking command coincides with a password number in the security protection information; if the two password numbers are found to coincide with each other, verifying whether an area ID included in the security protection unlocking command to designate an element of which security is protected coincides with an area ID in the security protection information; and if the two area IDs are found to coincide with each other, erasing from the storage means the host ID constituting part of the security protection information, a password number corresponding to the host ID, the area ID, element information about the element corresponding to the area ID, and a security level designating a restricted range in which commands from the host computer are executed.

The plurality of compartments constituting the medium rack accommodate recording media. Any desired recording medium may be transferred selectively from the medium rack to the drive which then writes or reads data to or from the recording medium in question.

The storage means such as a nonvolatile memory stores information about security protection that is locked on such elements as compartments in the medium rack and the drive. When security protection is to be locked, the system controller is supplied with a security protection locking command from the outside. Under control of the system controller, security protection information is written to the nonvolatile memory. The security protection information comprises illustratively a host ID, a password number, a security level, and a group of elements selected from such components as the compartments in the medium rack and the drive. When security protection is to be unlocked, the system controller is supplied with a security protection unlocking command from the outside. Under control of the system controller, applicable security protection information is erased from the nonvolatile memory.

When supplied with commands from an external sources such as a host computer, the system controller references the security protection information held in the nonvolatile memory for control on command execution. For example, when a certain recording medium is set for security protection against transfer, the host computer may issue a command for transferring the recording medium from the medium rack to the drive. In such a case, the attempted execution of the command is rejected.

BRIEF DESCRIPTION OF DRAWINGS

FIG. 4 is a schematic view of a command block constituting a general command (execution command);

FIG. 5 is a schematic view of a command block constituting a security protection locking (unlocking) command;

FIG. 6 is a view illustrating security protection information stored in a nonvolatile memory;

FIGS. 7 through 11 are flowcharts of steps in which a system controller controls command execution;

FIG. 12 is a schematic view of an alternative command block constituting the security protection locking (unlocking) command;

FIG. 13 is a schematic view of a data block making up data and supplied following the command of FIG. 12;

FIG. 14 is a schematic view of another alternative command block constituting the security protection locking (unlocking) command;

FIG. 15 is a schematic view of an alternative data block making up data and supplied following the command of FIG. 14; and FIG. 16 is another view illustrating security protection information stored in the nonvolatile memory.

BEST MODE FOR CARRYING OUT THE INVENTION

Figure 1:
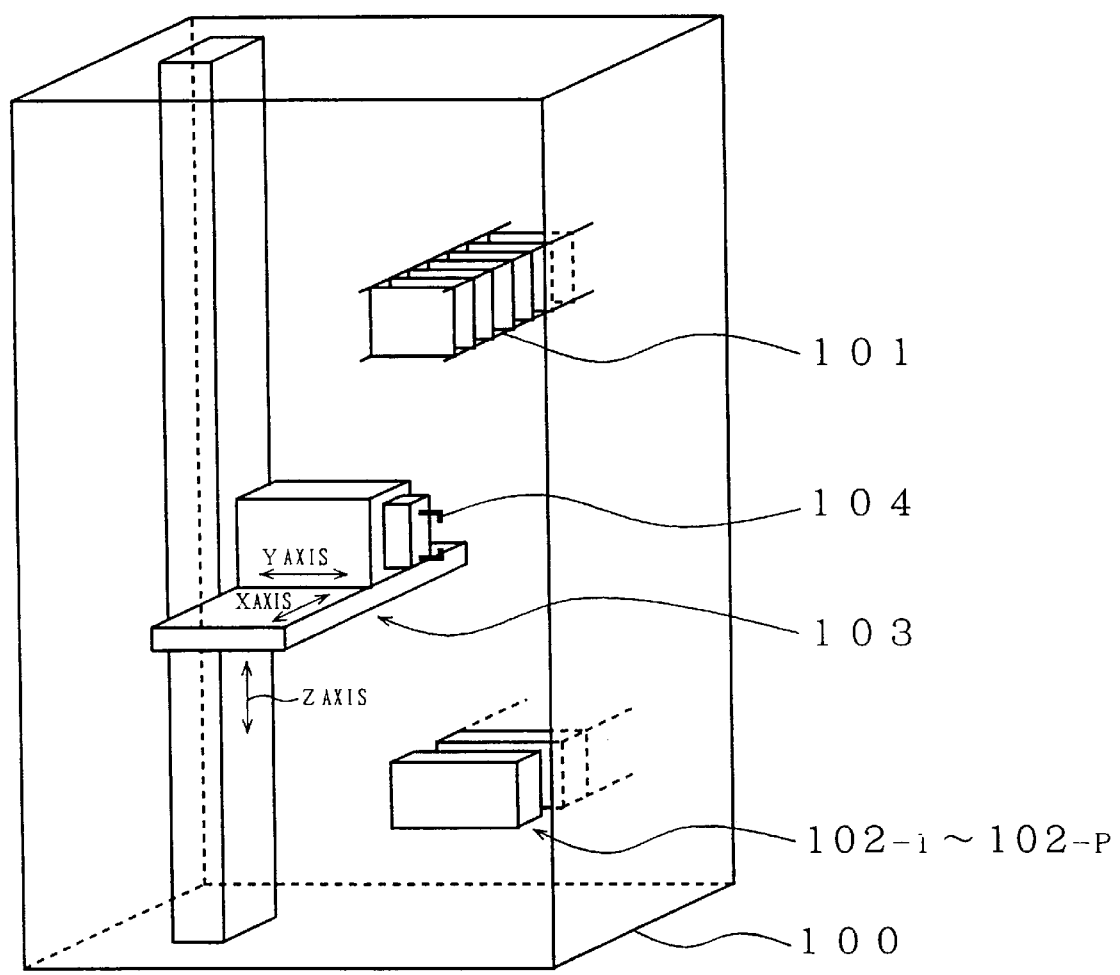
FIG. 1 is a schematic view of a tape changer apparatus representing the best mode for carrying out the invention.

FIG. 1 schematically outlines the structure of a tape changer apparatus 100 having an SCSI-based (ANSI X3. 131-1994) interface arrangement. As is well known, the SCSI allows a host computer designating a target to place both a host ID and a target ID onto a bus so that the target may recognize the host ID.

The changer apparatus 100 comprises a cassette rack 100 that accommodates a plurality of tape cassettes, a plurality of tape drives 102-1 through 102-P which write and read data to and from tape cassettes, and a robotics unit 103 which has a hand unit 104 for handling tape cassettes and which transfers tape cassettes between the cassette rack 101 and the tape drives 102-1 through 102-P. The cassette rack 101 has a plurality of compartments each accommodating a tape cassette.

In the above constitution, the robotics unit 103 extracts a desired tape cassette from the cassette rack 101, transfers the extracted tape cassette to one of the tape drives 102-1 through 102-P, and loads the cassette into the tape drive which then writes and/or reads data to and/or from the tape cassette. The tape cassette, with data written thereto or read therefrom, is ejected from the tape drive and is transferred by the robotics unit 103 back to the cassette rack 101 where the tape cassette is accommodated again.

Figure 2:
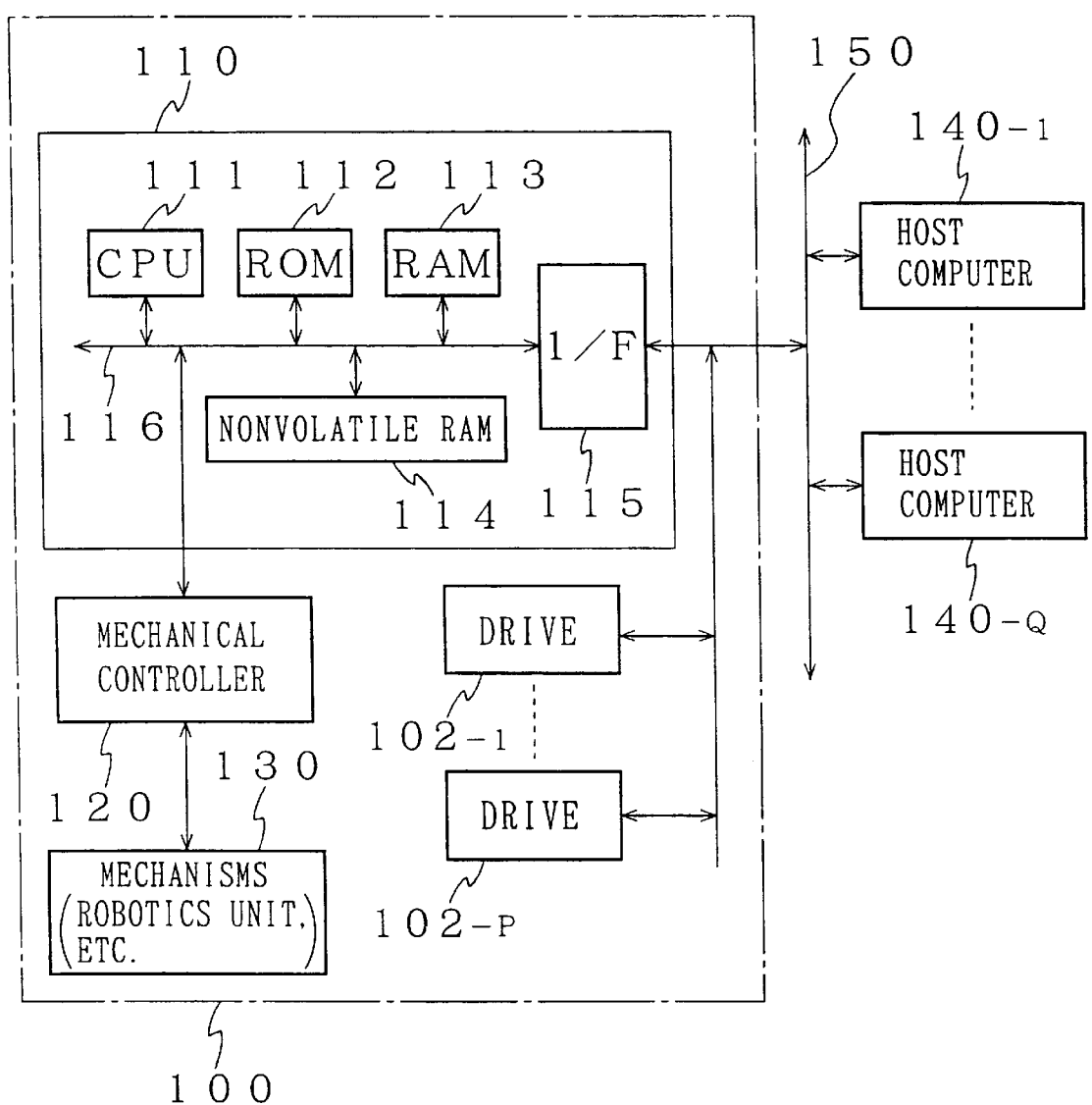
FIG. 2 is a block diagram outlining a control setup of the tape changer apparatus.

FIG. 2 outlines the control setup of the changer apparatus 100. The changer apparatus 100 further comprises a system controller 110 for controlling the apparatus as a whole, and a mechanical controller 120 for controlling mechanisms 130 including the robotics unit 103 as instructed by the system controller 110.

The system controller 110 is made up of a CPU (central processing unit) 111 for performing all computations, a ROM (read only memory) 112 that holds control programs, a RAM (random access memory) 113 for working purposes, a nonvolatile memory 114 that retains information about security protection, and an SCSI interface unit 115 for exchanging commands and data with the host computer. The ROM 112, RAM 113, nonvolatile memory 114, interface unit 115, and mechanical controller 120 are connected to the CPU via a bus 116.

The changer apparatus 100 maybe connected to aplurality of host computers 140-1 through 140-Q through the SCSI. That is, the interface unit 115 and the tape drives 102-1 through 102-P of the changer apparatus 100 may be connected through an SCSI bus 150 to the host computers 140-1 through 140-Q respectively.

Figure 3:
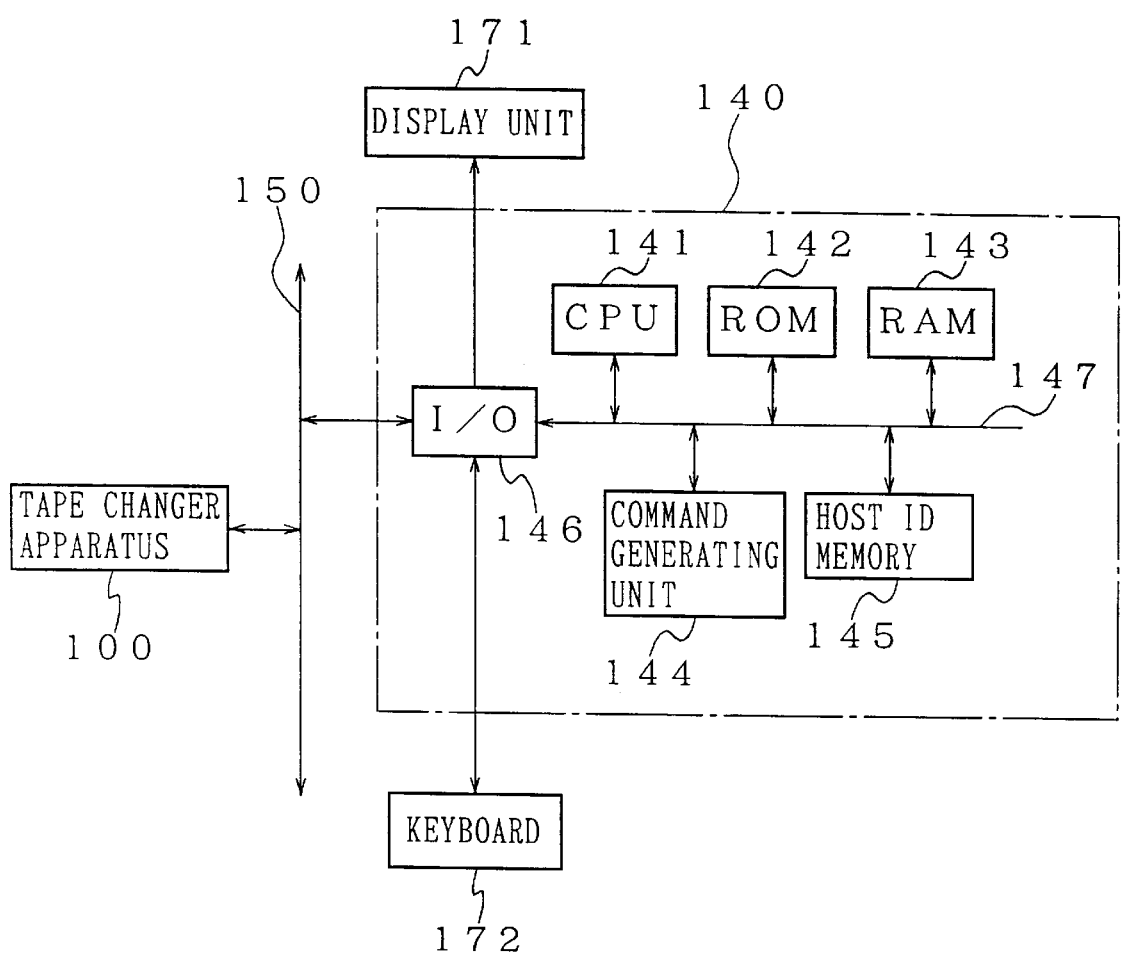
FIG. 3 is a block diagram of a host computer.

FIG. 3 outlines the structure of a host computer 140. Each host computer 140 comprises a CPU 141 that performs all computations, a ROM 142 that holds control programs, a RAM 143 for working purposes, a command generating unit 144 that generates SCSI commands of a known format, a host ID memory 145 that retains a host ID of the host computer in question, a display unit 171 acting as indicator means, a keyboard 172 serving as input means, and an input/output (I/O) unit 146 connected to the SCSI bus 150. The ROM 142, RAM 143, command generating unit 144, host ID memory 145, and I/O unit 146 are connected to the CPU 141 by means of a bus 147.

The command generating unit 144 generates SCSI commands of a known format under control of the CPU 141. The SCSI commands include general commands (execution commands), a security protection locking command, and a security protection unlocking command. When generating a security protection locking command or a security protection unlocking command, a user operates the keyboard 172 so as to input, for example, a password number corresponding to the host ID, element information about elements on which the command is to be executed, a security level representing a restricted range in which commands from the host computer are executed, and a command type indicating whether the command is a security protection locking command or a security protection unlocking command (see the command block illustrated in FIG. 5).

FIG. 4 shows a command block constituting a general command (execution command). This command is used to transfer a recording medium. In the command block of FIG. 4, byte 0 indicates an operation code for moving a recording medium; byte 1 has its high-order three bits denoting a LUN (logical unit number) based on the SCSI standard; bytes 2 and 3 represent the address of an element (transfer means) for transferring a tape cassette as a medium (transfer medium address); bytes 4 and 5 designate the address of a source element that accommodates the tape cassette to be transferred; and bytes 6 and 7 specify the address of a destination element for accommodating the tape cassette having been transferred. Byte 8 has its high-order nine bits reserved (i.e., all bits set for 0), and the least significant bit of byte 8 specifies whether the tape cassette in question is to be inserted to the destination element in inverted fashion. Illustratively, the tape cassette is not to be inverted when the least significant bit is 0 and is to be inverted when the LSB is 1. Byte 9 is an SCSI-based control byte. The control blocks constituting a security protection locking command or a security protection unlocking command will be described later.

In the above constitution, suppose that a command from any one of the host computers 140-1 through 140-Q is supplied through the SCSI bus 150 to the system controller 110 of the changer apparatus 100. In such a case, the system controller 110 refers to security protection information in the nonvolatile memory 114 to control the execution of the command. Illustratively, if the command from the host computer is one for gaining access to an element (any of the cassette rack 101, tape drivers 102-1 through 102-P, tape cassettes, etc.) whose security is protected against such attempted command execution, the system controller 110 rejects the execution of that command.

Security protection of the changer apparatus 100 is locked (or unlocked) by any of the host computers 140-1 through 140-Q supplying a security protection locking (or unlocking) command via the SCSI bus 150 to the system controller 110 of the changer apparatus 100.

FIG. 5 shows a command block constituting a security protection locking (unlocking) command. In the command block of FIG. 5, byte 0 indicates an operation code of a security protection command. Byte 1 has its high-order three bits denoting a LUN (logical unit number) based on the SCSI standard and has its low-order five bits representing a security level. The security level may illustratively designate one of three restrictive states: (1) a state in which requests to send tape cassette information (e.g., information represented by bar codes put on tape cassettes) to host computers are accepted, but any attempt to transfer tape cassettes is inhibited; (2) a state in which neither requests to send tape cassette information to host computers nor attempts to transfer tape cassettes are permitted; or (3) a state in which all attempts to access any tape cassettes for writing or reading data thereto or therefrom are inhibited.

Bytes 2 through 5 represent a password number. Bytes 6 and 7 denote the starting address of a group of elements whose security is to be protected. Bytes 8 and 9 indicate an element count, i.e., the number of elements involved. Although not elaborated above, the compartments composing the cassette rack 101 constitute a source element each, the tape drives 102-1 through 102-P make up a data destination element each, and the robotics unit 103 forms a medium transfer element. Each of these elements is assigned an element address.

A group of elements whose security is to be protected is selected from among the source elements, data destination elements, and others. The selected group of elements is specified by the starting address and by the element count. For example, where elements whose addresses are 1 through 10 in decimal are selected as a group of elements whose security is to be protected, the starting address is 1 and the element count is 10.

Byte 10 has its high-order nine bits reserved (i.e., all bits set for 0), and the least significant bit of byte 10 specifies whether security protection is to be locked or unlocked. Illustratively, security protection is locked when the least significant bit is 1 and is unlocked when the LSB is 0. Byte 11 is an SCSI-based control byte.

Suppose that the system controller 110 is supplied with the security protection locking command (with bit 0 of byte 10 set for 1) shown in FIG. 5. In that case, the system controller 110 locks security protection on the selected group of elements except when part or all of the elements overlap with those on which security protection has already been locked. As illustrated in FIG. 6, the nonvolatile memory 114 stores, as security protection information, host IDs of host computers having supplied security protection locking commands to the system controller, password numbers of the host computers, element groups each designated by a starting address and an element count, and security levels.

Suppose now that the system controller 110 is supplied with the security protection unlocking command (with bit 0 of byte 10 set for 0) shown in FIG. 5. In such a case, if the host ID, password number and element group set in the security protection unlocking command coincide with any ID, password number and element group in the security protection information in the nonvolatile memory 114, then the system controller 110 erases the applicable pieces of security protection information from the nonvolatile memory 114.

Figure 8:
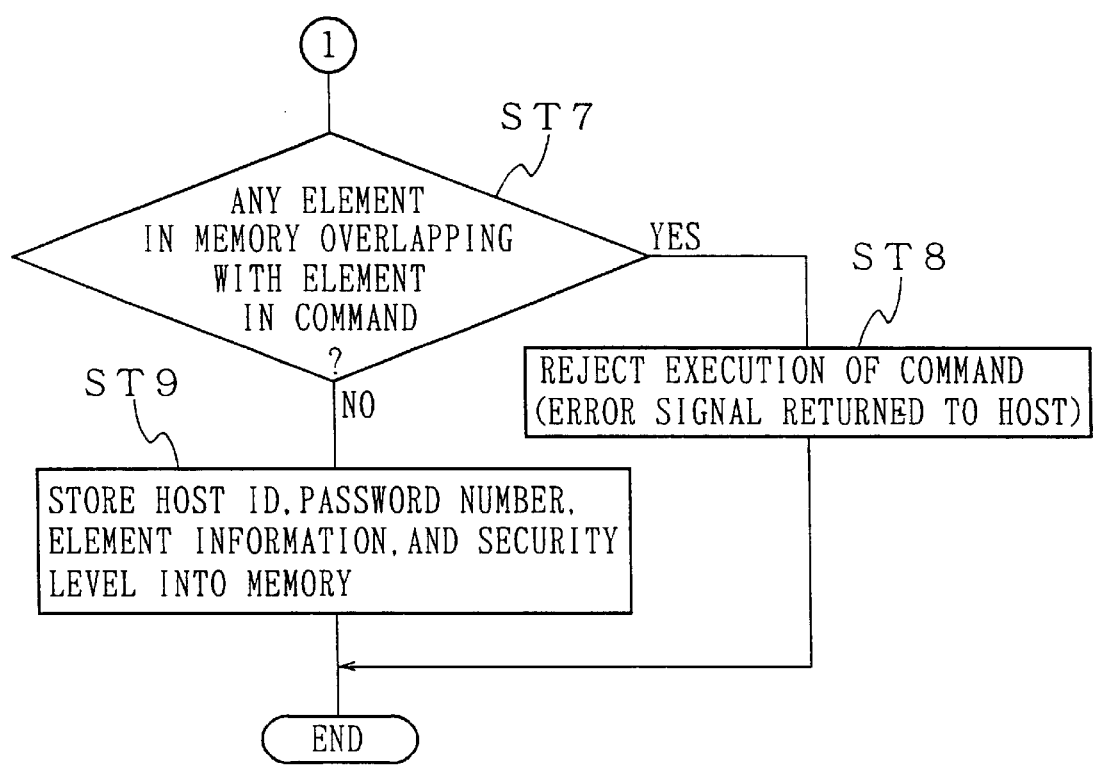
Figure 9:
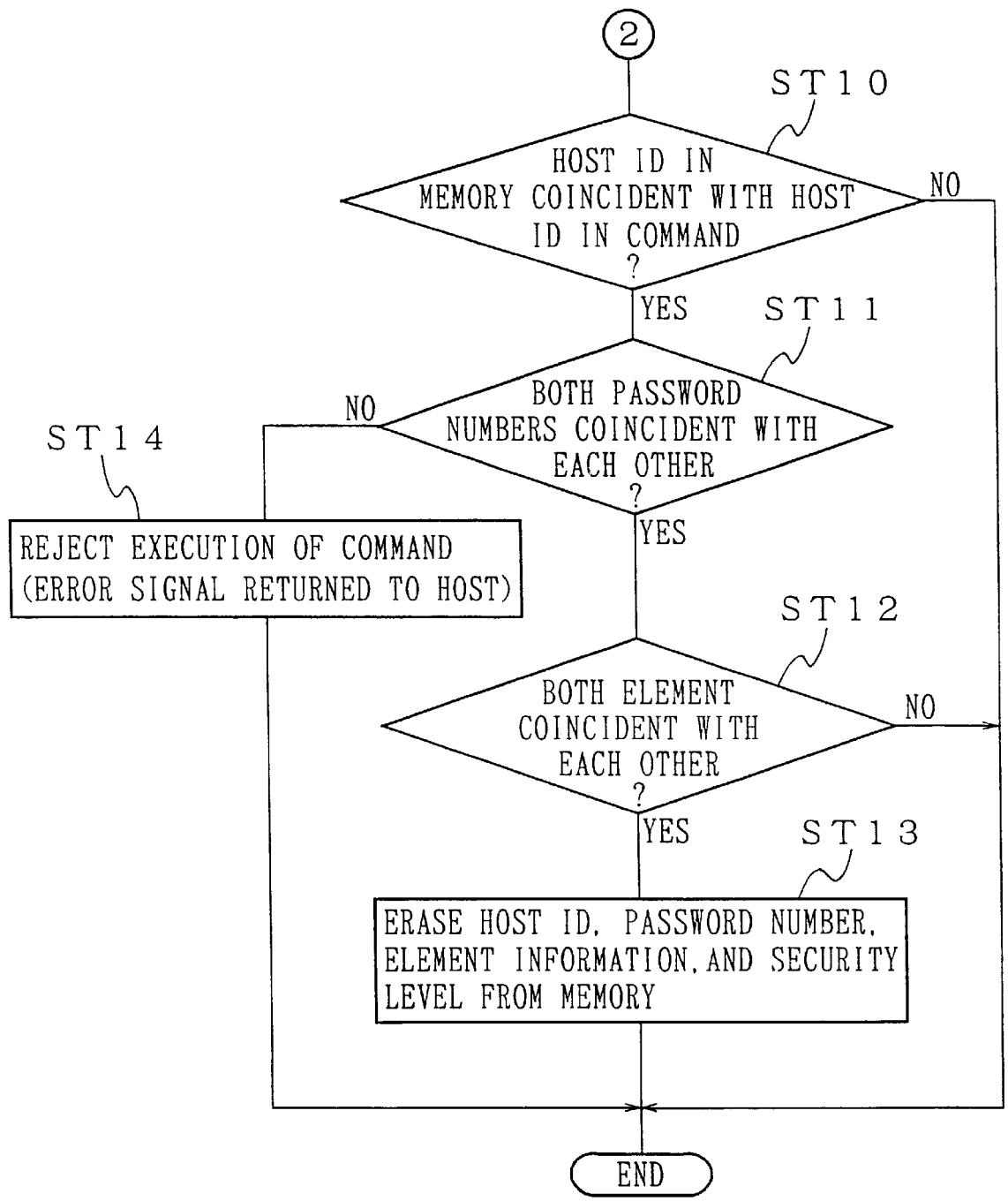

As mentioned above, the system controller 110 controls execution of a command by referring to the security protection information stored in the nonvolatile memory 114. The flowcharts of FIGS. 7 through 9 depict steps in which the system controller 110 typically carries out command execution control processing.

On receiving a command from any of the host computers 140-1 through 140-Q, the system controller enters step ST1 and checks to see if the command is a security protection command. If the command is found to be a general command (execution command) and not a security protection command, the system controller goes to step ST2 and checks to see if any of the element groups in the security protection information stored in the nonvolatile memory 114 coincides with the element group set in the command. If a matched element group is detected in the stored security protection information, step ST3 is reached in which a check is made to see if the host ID of the host computer having set the security protection information coincides with the host ID included in the command. If the element groups are found not to coincide with each other in step ST2, or if the two host IDs are found to coincide with each other in step ST3, step ST4 is reached. In step ST4, the received command is executed and the control processing is terminated.

If the two host IDs are found not to coincide with each other in step ST3, step ST5 is reached in which a check is made to see if the command in question may be executed under constraint of the security level currently in effect. If command execution is found to be feasible, step ST4 is reached in which the command is executed and the control processing is brought to an end. If command execution is found to be unfeasible in step ST5, the control processing is terminated immediately without transmission of an error signal to the host computer.

If the command is found to be a security protection command in step ST1, step ST6 is reached. In step ST6, a check is made to see if the command is a security protection locking command. If the command is found to be a security protection locking command, step ST7 is reached. In step ST7, a check is made to see if any of the element groups in the security protection information stored in the nonvolatile memory 114 overlaps with the element group set in the command. If such an element group overlap is found to exist, step ST8 is reached in which the execution of the command is rejected and an error signal is transmitted to the host computer. Step ST8 is followed by termination of the control processing. If the element group set in the command does not overlap with any of the element groups held in the nonvolatile memory 114, step ST9 is reached. In step ST9, the host ID, password number, element information, and security level (see FIG. 6) held in the command are written to the nonvolatile memory 114, and the control processing is brought to an end.

If the command is found to be a security protection unlocking command in step ST6, step ST10 is reached. In step ST10, a check is made to see if any host ID in the security protection information stored in the nonvolatile memory 114 coincides with the host ID set in the command. If the two host IDs are found to coincide with each other, step ST11 is reached. In step ST11, a check is made to see if the password number corresponding to the matched host ID in the stored security protection information coincides with the password number set in the command. If the two password numbers are found to coincide with each other, step ST12 is reached. In step ST12, a check is made to see if the element group corresponding to the matched host ID and password number in the stored security protection information coincides with the element group set in the command. If the two element groups are found to coincide with each other, step ST13 is reached in which the security protection information made up of the matched host ID, password number, element group and security level is erased from the nonvolatile memory 114, and the control processing is terminated.

If the password numbers are found not to coincide with each other in step STA11, step ST14 is reached in which the execution of the command is rejected and an error signal is sent to the host computer. Step ST14 is followed by termination of the control processing. If the host IDs are found not to coincide with each other in step ST10 or if the element groups are found not to coincide in step ST12, the control processing is terminated immediately without transmission of an error signal to the host computer.

In the above embodiment of the invention, as described, the security protection locking command is supplied to the system controller 110 to lock security protection. Host IDs, password numbers, security levels, element groups whose security is to be protected, and other security-related information are written to or erased from the nonvolatile memory 114. In executing commands from host computers, the system controller 110 references the stored security protection information so as to protect data security within the changer apparatus 100. When power is removed, the security protection information remains stored. Because unlocking of security protection requires the matching of password numbers, the internal data in the changer apparatus 100 is securely protected. In addition, the security level and the elements whose security is to be protected may be set as desired in order to address varieties of applications.

Illustratively, a group of compartments of the cassette rack 101 may be designated as the elements whose security is to be protected against access from host computers. In that case, the transfer of the tape cassettes held in the element group is inhibited, and so is access to the tape cassettes for reading or writing data thereto or therefrom. The embodiment above thus protects data recorded in the tape cassettes.

Suppose that the SCSI command from a host computer is found to be a general command (execution command) in the above setup and that any element group in the security protection information stored in the nonvolatile memory 114 coincides with the command group set in the command. In such a case, if the command has come from the host computer that has set the security protection information in question, the stored host ID coincides with the received host ID, and the command will be executed regardless of the security level in effect. If the command is sent by a host computer different from that which has set the security protection information, the stored host ID fails to coincide with the received host ID, and the execution of the command will be restricted by the security level in effect.

Figure 10:
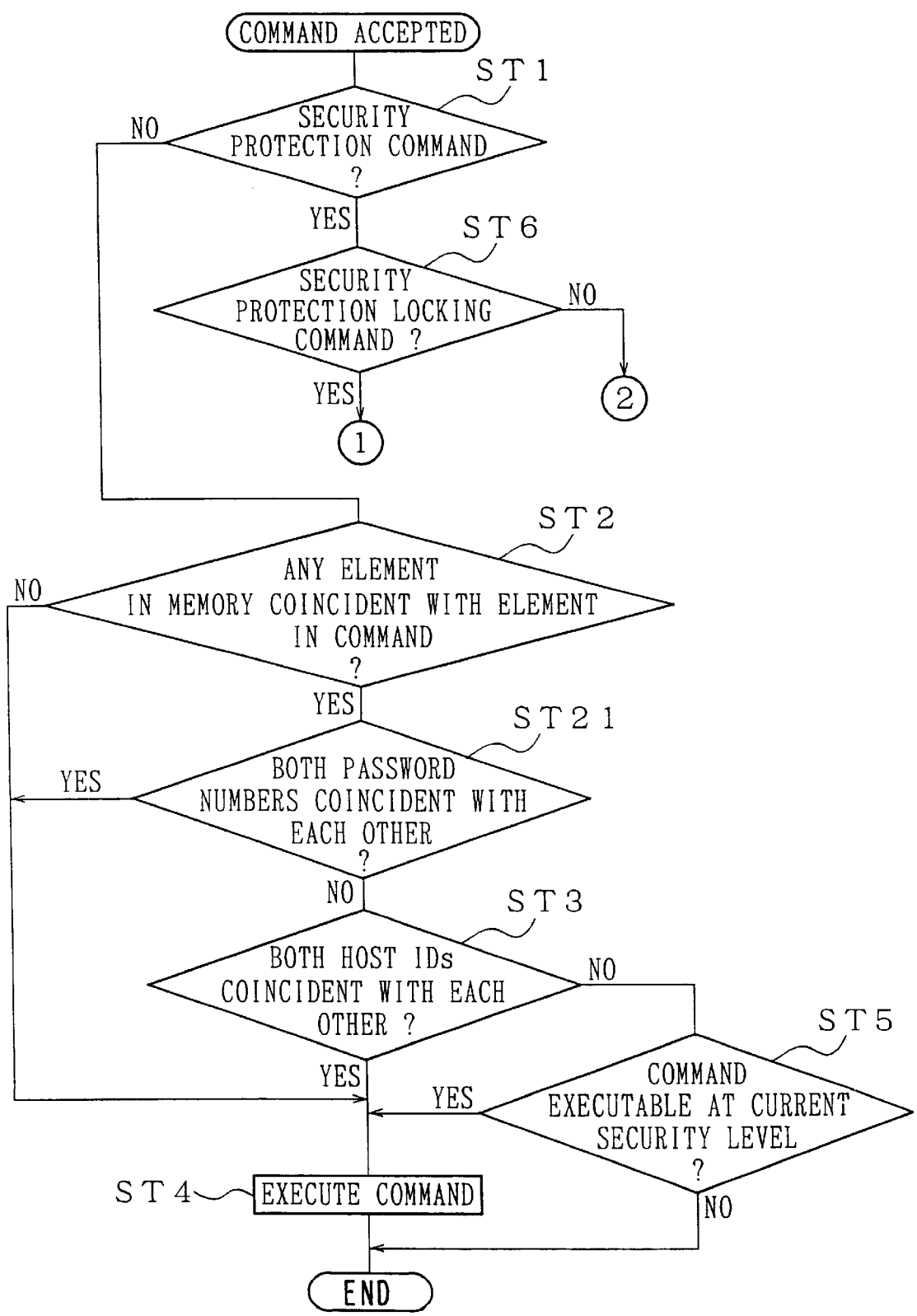

The flowchart of FIG. 10 shows steps in which the command is executed if any stored password number coincides with the received password number regardless of whether or not any stored host ID coincides with the received host ID. In this manner, if any element group in the security protection information stored in the nonvolatile memory 114 coincides with the element group set in the command and if the command has come from a host computer different from that which has set the security protection information, the command is executed without being restricted by the security level as long as the stored password number coincides with the received password number.

The flowchart of FIG. 10 will now be described. Of the reference numerals in FIG. 10, those already used in FIG. 7 designate like or corresponding steps. In step ST2, a check is made to see if any of the element groups in the security protection information stored in the nonvolatile memory 114 coincides with the element group set in the command. If a matched element group is detected in the stored security protection information, step ST21 is reached. In step ST21, a check is made to see if any password number in the stored security protection information coincides with the password number set in the command. If the two password numbers are found to coincide with each other, step ST4 is reached in which the command is executed and the control processing is terminated. If no stored password number is found to coincide with the received password number, step ST3 is reached. The other processes are the same as those in the flowchart of FIG. 7.

To implement the processing represented by the flowchart of FIG. 10 requires that any SCSI command sent from the host computer have a password number. The password number may be transmitted by use of a free region in the command block of an SCSI command or by utilizing a data block of the command.

Upon locking of security protection with the above setup, if any element group in the security protection information stored in the nonvolatile memory 114 overlaps with the element group set in the command, the execution of the command is rejected. This means that where the host computer having established the security protection information attempts to alter even the security level alone, it is necessary for the host computer to unlock security protection temporarily to erase the applicable information from the nonvolatile memory 114 and then to lock security protection again to set up a new security level.

Figure 11:
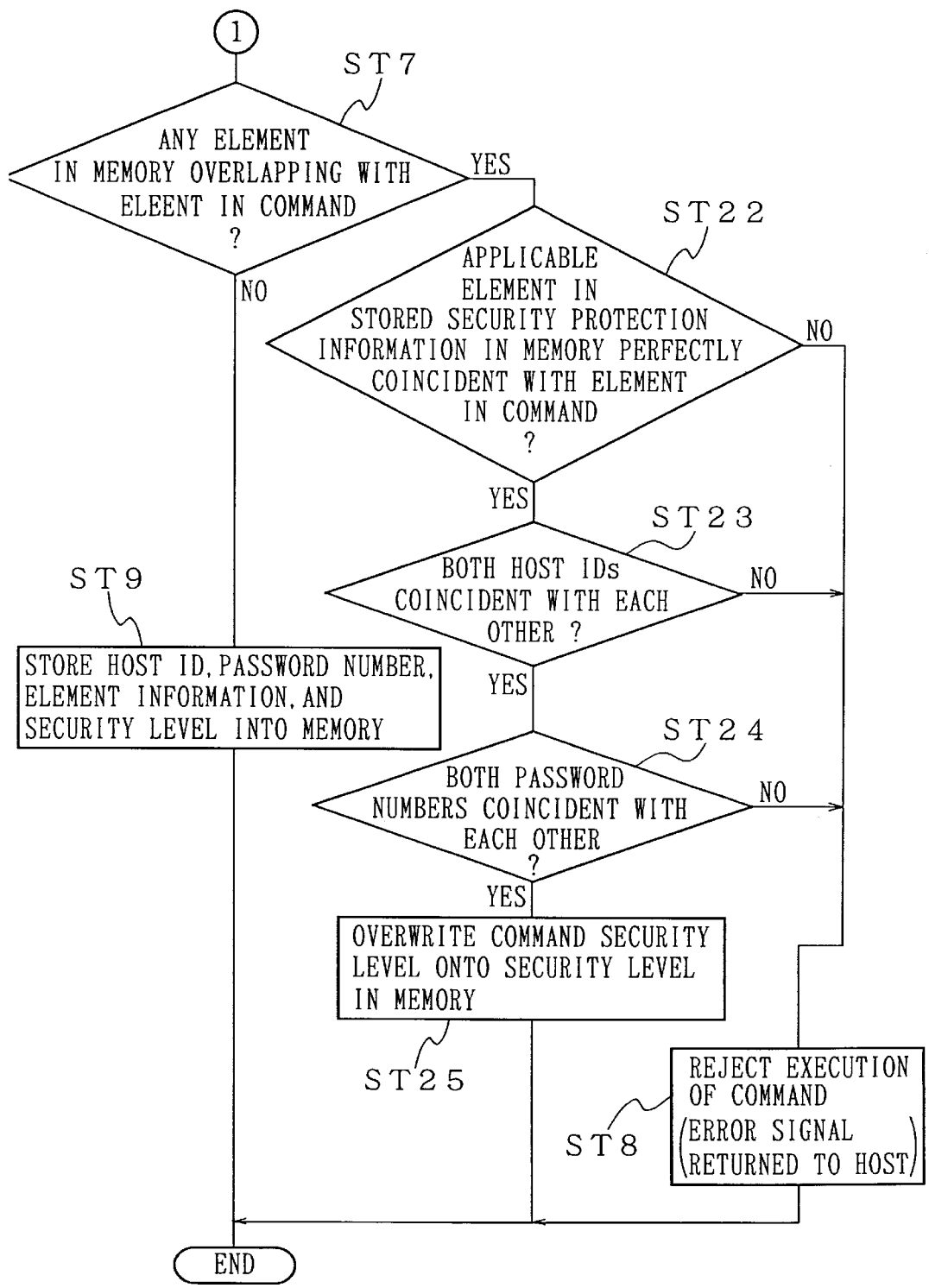

The flowchart of FIG. 11 shows steps allowing the host computer having established security protection information to alter the security level without unlocking security protection. The procedure helps the user to save time required for the security unlocking process.

The flowchart of FIG. 11 will now be described. Of the reference numerals in FIG. 11, those already used in FIG. 8 designate like or corresponding steps. In step ST7, a check is made to see if any of the element groups in the security protection information stored in the nonvolatile memory 114 overlaps with the element group set in the command. If no such overlap is detected, step ST9 is reached. In step ST9, the received host ID, password number, element information, and security level (see FIG. 6) are written to the nonvolatile memory 114 as security protection information, and the control processing is terminated.

If the element groups are found to overlap with each other in step ST7, step ST22 is reached. In step ST22, a check is made to see if the stored element group in the security protection information coincides perfectly with the element group set in the command. If the two element groups are found to coincide perfectly, step ST23 is reached. In step ST23, a check is made to see if the host ID representing the host computer that has set the security protection information coincides with the host ID set in the command. If the two host IDs are found to coincide with each other, step ST24 is reached. In step ST24, a check is made to see if the password number corresponding to the stored security protection information in question coincides with the password number set in the command. If the two password numbers are found to coincide with each other, step ST25 is reached in which the security level set in the command is overwritten onto the applicable security level in the stored security protection information. Step ST25 is followed by termination of the control processing.

If the two element groups are found not to coincide perfectly with each other in step ST22 or if the two host IDs are found not to coincide with each other in step ST23 or if the two password numbers are found not to coincide with each other in step ST24, step ST8 is reached in which the execution of the command is rejected and an error signal is transmitted to the host computer. Step ST8 is followed by termination of the control processing.

In the above embodiment, as shown in FIG. 5, the command block constituting a security protection locking command comprise a password number, element information about elements whose security is to be protected (i.e., starting address and element count), and a security level as security protection information. Instead of part or all of the security protection information being included in the command block and supplied to the system controller 110, the information may alternatively be fed as data to the system controller 110. Such an alternative arrangement illustratively increases the number of digits making up the password number to ensure higher security. It also makes it possible to specify groups of noncontiguous elements whose security is to be protected.

FIG. 12 schematically shows an alternative command block constituting a security protection locking (unlocking) command whereby a password number and element group information about a plurality of elements whose security is to be protected are supplied as data to the system controller 110.

Byte 0 in the command block of FIG. 12 represents an operation code of the security protection command. Byte 1 has its high-order three bits denoting a LUN (logical unit number) based on the SCSI standard and has its low-order five bits representing a security level. Bytes 2 through 6 are reserved (i.e., all bits set for 0). Bytes 7 through 9 indicate the size (in bytes) of a data block that will be supplied following this command block. Byte 10 has its high-order nine bits reserved (i.e., all bits set for 0), and the least significant bit of byte 10 specifies whether security protection is to be locked or unlocked. Byte 11 is an SCSI-based control byte.

FIG. 13 schematically shows a data block supplied following the command block explained above. Bytes 0 and 1 in the data block represent the number of digits constituting a password number. Bytes 2 through n−1 denote the password number. Bytes n and n+1 indicate the number of elements whose security is to be protected. Bytes n+2 and n+3 designate a starting address of an element group 1 of which security is protected. Bytes n+4 and n+5 specify the number of elements making up the protected element group 1. Subsequent bytes in the data block likewise represent the starting address and element count of each of element groups 2 through m whose security is to be protected.

In the above example, the security protection information is composed of password numbers, element group information (i.e., starting address and element count of each of element groups to be protected for data security), and security levels. In a preferred arrangement, an area ID representing a protected element group may additionally be included.

FIG. 14 is a schematic view of another alternative command block constituting a security protection locking (unlocking) command which has security protection information including an area ID corresponding to an element group whose security is to be protected.

Byte 0 in the command block of FIG. 14 represents an operation code of the security protection command. Byte 1 has its high-order three bits denoting a LUN (logical unit number) based on the SCSI standard and has its low-order five bits representing a security level. Byte 2 indicates an area ID corresponding to a group of elements whose security is to be protected. Bytes 3 through 6 are reserved (i.e., all bits set for 0). Byte 7 through 9 indicate the size (in bytes) of a data block that will be supplied following this command block. Byte 10 has its high-order nine bits reserved (i.e., all bits set for 0), and the least significant bit of byte 10 specifies whether security protection is to be locked or unlocked. Byte 11 is an SCSI-based control byte.

FIG. 15 schematically shows a data block supplied following the command block described above. Bytes 0 and 1 in the data block represent the number of digits constituting a password number. Bytes 2 through n−1 denote the password number. Bytes n and n+1 indicate a starting address of an element group whose security is to be protected. Bytes n+2 and n+3 specify the number of elements making up the protected element group.

Area IDs each representing a protected element group may be included as part of the security protection information. In that case, the nonvolatile memory 114 accommodates host IDs each denoting a host computer having supplied a security protection locking command, as well as the area IDs, starting addresses and element counts indicating element groups, and security levels, as shown in FIG. 16.

Where the nonvolatile memory 114 stores area IDs each corresponding to a protected element group as part of the security protection information, it is possible to unlock security protection on condition that the host ID, password number, and area ID in the command coincide with their counterparts in the stored security protection information. That is, an alternative check will replace the one made in step ST12 of FIG. 9 to see if the element group corresponding to the matched host ID and password number in the stored security protection information coincides with the element group set in the command. The alternative check involves verifying whether the area ID corresponding to the matched host ID and password number in the stored security protection information coincides with the area ID set in the command.

In the above embodiment, the elements to be protected for data security include the compartments making up the cassette rack 101, the tape drives 102-1 through 102-P, and the robotics unit 103 serving as the means for transferring tape cassettes. Preferably, a tape cassette ejecting unit, not shown in FIG. 1, may also be included as an element whose security is to be protected. With the tape cassette ejecting unit designated as part of the element group to be protected, the ejection of tape cassettes is inhibited and data security is thereby protected.

In the embodiment above, the SCSI is adopted as the standard interface. Alternatively, the invention may also be applied to methods and apparatuses based on other standardized interfaces (e.g., IEEE 1394).

The above embodiment was shown applying the invention to the tape changer apparatus 100 whose recording media are tape cassettes. Alternatively, the invention may also be applied to disk changer apparatuses of which the recording media include magnetic disks, optical disks, magneto-optical disks, and the like.

In the embodiment above, the nonvolatile memory 114 is provided to retain security protection information. Where there is no possibility of power being removed, a volatile memory may be used alternatively to store security protection information.

As described and according to the invention, security protection information is stored illustratively in a nonvolatile memory. The information is referenced by the controller that controls the execution of commands coming from host computers. When power is turned off, the stored information remains intact and serves as the basis for protecting security of data within the changer apparatus. With passwords used as part of the security protection information, security protection is unlocked only upon coincidence of a stored and a subsequently supplied password number. This ensures higher levels of data security protection than before. Furthermore, varieties of applications may be addressed where a desired group of elements whose security is to be protected and a preferred security level are set as part of the security protection information.

INDUSTRIAL APPLICABILITY

As described, the invention is adapted advantageously, for example, to a changer apparatus which handles tape cassettes, magnetic disks, optical disks, magneto-optical disks, or the like and which is connected to a plurality of host computers through a standardized interface.

We claim:

1. A changer apparatus comprising:
   a plurality of compartments for accommodating recording media;
   at least one drive for accessing a respective recording medium;
   a recording medium transfer unit for transferring said recording medium from one of said compartments to said drive;
   a storage device for storing security protection information representing at least one of a plurality of security levels, each security level corresponding to a different level of access for accessing said recording media;
   a command input for inputting an externally input command requesting access to a respective recording medium in accordance with a respective security level; and
   a system controller for controlling execution of said command input by said command input in accordance with said respective security level represented by said security protection information stored in said storage device for said respective recording medium.

2. A changer apparatus according to claim 1, wherein said storage device is a nonvolatile memory.

3. A changer apparatus according to claim 1, wherein said command is supplied externally from a host computer.

4. A changer apparatus according to claim 3, wherein said security protection information is written/erased to/from said storage device in accordance with command input by said command input.

5. A changer apparatus according to claim 4, wherein said command is a security protection command which includes:
   a password/passnumber indicating an authorized access of said respective recording medium;
   at least one element information for designating said respective recording medium; and
   a command type indicating at least whether said security protection command is a security protection locking command for setting said respective security level for said respective recording medium or a security protection unlocking command for unsetting said respective security level for said respective recording medium.

6. A changer apparatus according to claim 5, wherein said security protection command further includes host IDs corresponding to a plurality of host computers, and wherein said host IDs are each associated with a different password/passnumber.

7. A changer apparatus according to claim 5, wherein said security protection command further includes an area ID which identifies said respective recording medium.

8. A changer apparatus according to claim 5, wherein said security protection command restricts a range of commands from said host computer which said system controller executes; wherein said security levels include a level which permits a request from said host computer to retrieve recording media information about said respective recording medium and inhibits a request from said host computer to transfer said respective recording medium from said compartments to said drive, a level which inhibits requests from said host computer to retrieve said recording media information and inhibits requests from said host computer to transfer said respective recording medium from said compartments to said drive and a level which inhibits requests to read/write from/to said respective recording medium.

9. A changer apparatus according to claim 8, wherein said security protection command further includes an area ID which identifies said respective recording medium.

10. The apparatus according to claim 8, wherein said recording media information is stored in the form of a bar code on said recording media.

11. A changer apparatus according to claim 3, wherein said storage device stores said command as security protection information including:
    host IDs each of which corresponds to one of a plurality of host computers;
    a password/passnumber indicating an authorized access of said respective recording medium;
    at least one element information for designating said respective recording medium; and
    a plurality of security levels each of which designates a restricted range of commands from said plurality of host computers which said system controller executes; wherein said security levels include a level which permits a request from said host computer to retrieve recording media information about said respective recording medium and inhibits a request from said host computer to transfer said respective recording medium from said compartments to said drive, a level which inhibits requests from said host computer to retrieve said recording media information and inhibits requests from said host computer to transfer said respective recording medium from said compartments to said drive and a level which inhibits requests to read/write from/to said respective recording medium.

12. A changer apparatus according to claim 11, wherein said storage device stores as said security protection information an area ID which identifies said respective recording media.

13. A changer apparatus according to claim 1, wherein said command input is a small computer system interface and wherein said command is a small computer system interface command.

14. The apparatus according to claim 1, wherein said command is a data block comprising codes for directing said system controller to execute said command.

15. The apparatus according to claim 14, wherein said data block includes a password/passnumber code for directing said system controller to execute commands from said host computer, a command code for directing said system to execute said command and an ID code for designating to said system controller said respective recording medium.

16. The apparatus according to claim 15, wherein said command code is a lock command which directs said system controller to set said respective security level to said respective recording medium.

17. The apparatus according to claim 16, wherein said host computer supplies said data block which locks said respective recording medium to said respective security level; wherein said system controller thereafter executes a command of another host computer in accordance with said security level if said another host computer supplies said password/passnumber.

18. The apparatus according to claim 17, wherein said system controller executes any command of said succeeding data block when said host computer supplies said previous data block.

19. The apparatus according to claim 16, wherein said system controller changes said security levels without unlocking said respective recording medium when said host computer which supplied said previous data blocks requests changing said security levels.

20. The apparatus according to claim 14, wherein said ID code is a logical unit number of a small computer system interface.

21. A host computer for use with a changer apparatus comprising a medium rack having a plurality of compartments for accommodating recording media, at least one drive for gaining access to said recording media, a recording medium transfer means for transferring said recording media between said medium rack and said drive, a storage means for storing security protection information by which to ensure security protection, a command input means for admitting an externally input command, and a system controller for controlling execution of said command entered through said command input means in accordance with said security protection information stored in said storage means, said host computer outputting said command to said changer apparatus, said host computer comprising:

- a storage means for storing a host ID of said host computer;
- an input means for admitting a password number corresponding to said host ID;
- an input means for admitting element information designating at least one element on which said command is to be executed;
- an input means for admitting a command type indicating at least whether said command is a security protection locking command or a security protection unlocking command;
- a command generation means for generating said command by formatting said host ID, said password number, said element information, and said command type into a suitable format; and
- an output means for outputting said command to said changer apparatus.

22. A command execution method for use with a changer apparatus comprising a medium rack having a plurality of compartments for accommodating recording media, at least one drive for gaining access to said recording media, a recording medium transfer means for transferring said recording media between said medium rack and said drive, a storage means for storing security protection information by which to ensure security protection, a command input means for admitting an externally input command, and a system controller for controlling execution of said command entered through said command input means in accordance with said security protection information stored in said storage means, said command execution method comprising:

- an element information coincident verifying step for verifying whether element information included in said command to designate an element on which said command is to be executed coincides with element information included in said security protection information stored in said storage means and
- an executing step for executing said command on the element designated by the element information included in said command if the two kinds of element information are found not to coincide with each other in said element information coincident verifying step.

23. A command execution method according to claim 22, further comprising:

- a host ID coincident verifying step for verifying whether a host ID of a host computer having output said command coincides with a host ID corresponding to the element information stored in said storage means if said two kinds of element information are found to coincide with each other in said element information coincident verifying step and
- an executing step for executing said command on the element designated by said element information if the two host IDs are found to coincide with each other in said host ID coincident verifying step.

24. A command execution method according to claim 23, further comprising:

- a security level restriction verifying step for verifying whether execution of said command is restricted by a security level designating a restricted range in which commands from said host computer are executed if said two host IDs are found not to coincide with each other in said host ID coincident verifying step and
- an executing step for executing said command on the element designated by said element information if execution of said command is found not restricted by said security level in said security level restriction verifying step.

25. A command execution method according to claim 22, further comprising:

- a password number coincident verifying step for verifying whether a password number of a host computer having output said command coincides with a password number corresponding to the element information stored in said storage means if said two kinds of element information are found to coincide with each other in said element information coincident verifying step and
- an executing step for executing said command on the element designated by said element information if the two password numbers are found to coincide with each other in said password number coincident verifying step.

26. A command execution method according to claim 25, further comprising:

- a host ID coincident verifying step for verifying whether a host ID of said host computer having output said command coincides with a host ID corresponding to the element information stored in said storage means if said two password numbers are found not to coincide with each other in said password number coincident verifying step and
- an executing step for executing said command on the element designated by said element information if said two password numbers are found to coincide with each other in said host ID coincident verifying step.

27. A command execution method according to claim 26, further comprising:
   a security level restriction verifying step for verifying whether or not execution of said command is restricted by a security level designating a restricted range in which commands from said host computer are executed if said two host IDs are found not to coincide with each other in said host ID coincident verifying step and
   an executing step for executing said command on the element designated by said element information if execution of said command is found not restricted by said security level in said security level restriction verifying step.

28. A security protection locking method for use with a changer apparatus comprising a medium rack having a plurality of compartments for accommodating recording media, at least one drive for gaining access to said recording media, a recording medium transfer means for transferring said recording media between said medium rack and said drive, a storage means for storing security protection information by which to ensure security protection, a command input means for admitting an externally input command, and a system controller for controlling execution of said command entered through said command input means in accordance with said security protection information stored in said storage means, said security protection locking method comprising:
   a command input step for admitting a command from a host computer furnished externally;
   a command verifying step for verifying whether the command received from said host computer is a security protection locking command;
   an overlap verifying step for verifying whether element information included in said security protection locking command to designate an element on which security protection is to be locked overlaps with element information included in said security protection information stored in said storage means if the command from received said host computer is found to be a security protection locking command in said command verifying step; and
   a storing step for storing into said storage means a host ID of said host computer, a password number corresponding to said host ID, the element information included in said security protection locking command, and a restricted range in which commands from said host computer are executed if the two kinds of element information are found not to overlap with each other in said overlap verifying step.

29. A security protection locking method according to claim 28, further comprising an error signal output step for outputting an error signal to said host computer if said two kinds of element information are found to overlap with each other in said overlap verifying step.

30. A security protection locking method according to claim 28, further comprising:
   a perfect coincident verifying step for verifying whether the element information in said security protection information stored in said storage means coincides perfectly with the element information included in said security protection locking command to designate the element on which security protection is to be locked if said two kinds of element information are found to overlap with each other in said overlap verifying step;
   a host ID coincident verifying step for verifying whether the host ID of said host computer coincides with a host ID in said security protection information stored in said storage means if said two kinds of element information are found to coincide perfectly with each other in said perfect coincident verifying step;
   a password number coincident verifying step for verifying whether a password number included in said security protection locking command coincides with the password number in said security protection locking command stored in said storage means if the two host IDs are found to coincide with each other in said host ID coincident verifying step; and
   an overwriting step for overwriting a security level included in said security protection locking command onto a security level part in said security protection information stored in said storage means if the two password numbers are found to coincide with each other in said password number coincident verifying step.

31. a security protection unlocking method for use with a changer apparatus comprising a medium rack having a plurality of compartments for accommodating recording media, at least one drive for gaining access to said recording media, a recording medium transfer means for transferring said recording media between said medium rack and said drive, a storage means for storing security protection information by which to ensure security protection, a command input means for admitting an externally input command, and a system controller for controlling execution of said command entered through said command input means in accordance with said security protection information stored in said storage means, said security protection unlocking method comprising:
   a command input step for admitting a command from a host computer furnished externally;
   a command verifying step for verifying whether the command received from said host computer is a security protection unlocking command;
   a host ID coincident verifying step for verifying whether a host ID of said host computer coincides with a host ID in said security protection information stored in said storage means if the command received from said host computer is found to be a security protection unlocking command in said command verifying step;
   a password number coincident verifying step for verifying whether a password number included in said security protection unlocking command coincides with a password number in said security protection information if the host ID of said host computer and the host ID in said security protection information stored in said storage means are found to coincide with each other in said host ID coincident verifying step;
   an element information coincident verifying step for verifying whether element information included in said security protection unlocking command to designate an element of which security is protected coincides with element information included in said security protection information if the two password numbers are found to coincide with each other in said password number coincident verifying step; and
   an erasing step for erasing from said storage means the host ID constituting part of said security protection information, a password number corresponding to said host ID, said element information, and a security level designating a restricted range in which commands from said host computer are executed if the two kinds of element information are found to coincide with each other in said element information coincident verifying step.

32. A security protection unlocking method for use with a changer apparatus comprising a medium rack having a plurality of compartments for accommodating recording media, at least one drive for gaining access to said recording media, a recording medium transfer means for transferring said recording media between said medium rack and said drive, a storage means for storing security protection information by which to ensure security protection, a command input means for admitting an externally input command, and a system controller for controlling execution of said command entered through said command input means in accordance with said security protection information stored in said storage means, said security protection unlocking method comprising:

a command input step for admitting a command from a host computer furnished externally;

a command verifying step for verifying whether the command received from said host computer is a security protection unlocking command;

a host ID coincident verifying step for verifying whether a host ID of said host computer coincides with a host ID in said security protection information stored in said storage means if the command received from said host computer is found to be a security protection unlocking command in said command verifying step;

a password number coincident verifying step for verifying whether a password number included in said security protection unlocking command coincides with a password number in said security protection information if the host ID of said host computer and the host ID in said security protection information stored in said storage means are found to coincide with each other in said host ID coincident verifying step;

an area ID coincident verifying step for verifying whether an area ID included in said security protection unlocking command to designate an element of which security is protected coincides with an area ID in said security protection information if the two password numbers are found to coincide with each other in said password number coincident verifying step; and an erasing step for erasing from said storage means the host ID constituting part of said security protection information, a password number corresponding to said host ID, said area ID, element information about said element corresponding to said area ID, and a security level designating a restricted range in which commands from said host computer are executed if the two area IDs are found to coincide with each other in said area ID coincident verifying step.

\* \* \* \* \*